United States Patent [19]

Thompson

[11] 4,081,428
[45] Mar. 28, 1978

[54] PREPARATION OF POLYMERS

[75] Inventor: Ronald Austin Thompson, Harrogate, England

[73] Assignee: Imperial Chemical Industries Limited, Great Britain

[21] Appl. No.: 726,163

[22] Filed: Sep. 24, 1976

[30] Foreign Application Priority Data

Sep. 24, 1975 United Kingdom ............... 39132/75

[51] Int. Cl.² .................... C08G 63/68; C08G 63/22
[52] U.S. Cl. ............... 260/75 N; 260/75 M; 560/86
[58] Field of Search ................. 260/75 N, 75 M, 75 T

[56] References Cited

U.S. PATENT DOCUMENTS

| 3,433,770 | 3/1969 | Shima et al. | 260/75 M |
| 4,004,960 | 1/1977 | Crowell | 260/75 T X |

OTHER PUBLICATIONS

Shima, et al., *Chemical Abstracts*, vol. 74:127,374h, (1974).
Shima, et al., *Chemical Abstracts*, vol. 79:147,001r, (1973).
Shima, et al., *Chemical Abstracts*, vol. 81:170,257d, (1974).
Shima, et al., *Chemical Abstracts*, vol. 81:136,753c, (1974).
Korshak, et al., *Polyesters*, Pergamon Press, N.Y., (1965), pp. 265–266.

*Primary Examiner*—Walter C. Danison
*Attorney, Agent, or Firm*—Cushman, Darby & Cushman

[57] ABSTRACT

A process for the preparation of a high molecular weight, linear polyesteramide comprising the capping of a linear, hydroxyl-ended polyester by reaction with a diaryl ester of a dicarboxylic acid of the formula:

$$AOOC-(-X-)_n-COOB$$

wherein $n$ is zero or 1: X is a divalent aromatic group, and A and B each independently stand for a monovalent aryl group of 6 to 20 carbon atoms, in the presence of a catalyst, and reaction of the capped polyester with a diamine to form a polyesteramide.

9 Claims, No Drawings

PREPARATION OF POLYMERS

The present invention relates to the preparation of high molecular weight, linear polyesteramides.

According to the present invention we provide a process for the preparation of a high molecular weight, linear polyesteramide comprising the capping of a linear, hydroxyl-ended polyester by reaction with a diaryl ester of a dicarboxylic acid of the formula:

$$AOOC\text{—}(\text{—}X\text{—})_n\text{—}COOB$$

wherein $n$ is zero or 1: X is a divalent aromatic group, and A and B each independently stand for a monovalent aryl group of 6 to 20 carbon atoms, in the presence of a catalyst, and reaction of the capped polyester with a diamine to form a polyesteramide. Preferably the group X is para-phenylene.

By the expression "capping" we mean that each of the hydroxyl terminal groups of the polyester is reacted with an ester group of the diaryl ester of a dicarboxylic acid, eliminating a molecule of a phenol. Ideally the capping reaction can be expressed:

$$HO\text{—}P\text{—}OH + 2AOOC\text{—}(\text{—}X\text{—})_n\text{—}COOB \rightarrow$$
$$AOOC\text{—}(\text{—}X\text{—})_n\text{—}COO\text{—}P\text{—}OOC\text{—}(\text{—}X\text{—})_n\text{—}COOA + 2B\text{—}OH$$

where —P— represents the polymer chain separating the terminal hydroxyls of the polyester; in this equation it is seen that the polyester chain is extended at each end only by the addition of one dicarboxylic acid residue and one esterifying aryl group. However, in practice it is found that whatever the molecular ratio of diaryl ester of a dicarboxylic acid and the hydroxyl-ended polyester brought into reaction with one another, some of the diaryl ester remains unreacted at the end of the process, and some of it is used in linking up two or more of the original polyester molecules by the following reaction:

$$g[HO\text{—}P\text{—}OH] + (g+1)[AOOC\text{—}(\text{—}X\text{—})_n\text{—}COOB] \rightarrow$$
$$AOOC\text{—}(\text{—}X\text{—})_n\text{—}COO\text{—}[\text{—}P\text{—}OOC\text{—}(\text{—}X\text{—})_n\text{—}COO\text{—}]_g\text{—}A +$$
$$(g-1)A\text{—}OH + (g+1)B\text{—}OH$$

where —P— has the meaning aforesaid and $g$ is an integer greater than 1. This reaction is known as coupling or chain extension. The finding that a mixture of molecular sizes (including unreacted monomer) results from the reaction of a bi-functional hydroxylic molecule and a bi-functional aryl ester molecule in unequal molecular quantities is in accordance with the well-known principles of condensation polymerisation. The coupling reaction is not harmful, since the longer polyester chains produced can still be regarded as capped, since they still carry reactive aryl ester end groups able to undergo condensation with a diamine to build up the final polyesteramide. The presence in the capped polyester of unreacted diaryl ester of a dicarboxylic acid also is not harmful, although the quantity of such unreacted diaryl ester must be controlled, since its concentration affects the length of the oligomeric amide chain segments to be formed in the stage of reaction with a diamine.

An important requirement for the capping reaction is that after it has taken place, virtually all of the ends of the polyester molecules should be derived from the diaryl ester of a dicarboxylic acid. This requirement may be attained by appropriate choice of the molecular ratio of the diaryl ester to the initial polyester and appropriate choice of temperature and time of reaction and of type and concentration of catalyst. Thus increase in ratio of molecules of diaryl ester to molecules of polyester will favour attainment of an adequate degree of capping, whereas too long a reaction time at a particular temperature will cause degradation of the material with alteration of the structure and possible loss of the capping.

Preferably the molecular ratio of diaryl ester of dicarboxylic acid to the polyester is not less than 1.5 to 1 and not greater than 5 to 1. This ratio is important not only in achieving an adequate degree of capping, and thus giving the capped polyester a sufficient reactivity to reach a high molecular weight in the following reaction with a diamine, but, as explained in the description of the capping reaction, also in determining the relative length of the polyester and polyamide segments in the final polyesteramide, and hence the mechanical properties of the elastomer produced. Preferably the capping reaction should include a final stage carried out at reduced pressure, preferably below a pressure of 5 mm. of mercury.

The initial polyester preferably has a molecular weight not greater than 10,000 and not less than 700. The polyester may be prepared according to any of the known methods, provided that no undesirable by-products or catalyst residues are present in it.

If no catalyst is used in the preparation of the initial polyester, a catalyst may still be used advantageously for the capping stage, whereas if a catalyst is used in the preparation of the initial polyester an additional quantity of that catalyst or an additional catalyst may advantageously be used for the capping stage.

Catalysts which may be employed for the capping reaction are, for example, compounds of antimony, germaniun, tin, titanium, zinc, cobalt, manganese and lead. These elements in the metallic state are also effective, but usually less so.

The capping reaction between the polyester and the diaryl ester of a dicarboxylic acid may be carried out at a temperature between 180° and 280° C., preferably between 200° and 250° C.

The reaction of the diamine with the capped polyester should be carried out at a temperature above 130°, and should include at least a final stage at a temperature above 220°; suitable temperatures are in the range 240° to 280°. If too low a temperature is used in this reaction, it is found that a sufficiently high molecular weight of the resultant polyesteramide cannot be achieved. Preferably a final stage at reduced pressure, preferably below 5 mm, should be included.

The initial polyester may be a homopolyester or a copolyester containing two or more different repeating units. Preferably the polyester is a copolyester. It is preferably derived from one or more dicarboxylic acids of the formula: HOOC—D—COOH and one or more glycols of the formula HO—E—OH.

In the formula HOOC—D—COOH, the group —D— is either the group —$(CH_2)_m$—, where $m$ is an integer, preferably from 3 to 10, or more preferably 4 to 10, or another bifunctional aliphatic group derived from the group —$(CH_2)_m$— by replacement of one or more —$CH_2$— groups by the groups

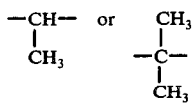

In such examples of the group —D— carrying substituent methyl groups, the total number of carbon atoms is not more than 10.

Examples of suitable dicarboxylic acids are adipic, azelaic, 2,2,4-trimethyl-adipic and dodecanedioic acids. Minor proportions of dicarboxylic acids not of the above defined structural class may be included in copolyester structures, provided that they have adequate reactivity and stability not to hinder the achievement of the required molecular weight, as defined hereinbefore.

In the formula HO—E—OH, the group —E— is either the group —$(CH_2)_q$—, where $q$ is an integer from 2 to 12, or another bifunctional aliphatic group derived from the group —$(CH_2)_q$ by replacement of one or more —$CH_2$— groups by the groups

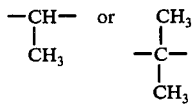

provided that no hydroxyl group is directly attached to a

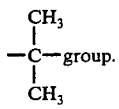

Where substituent methyl groups are present, the total number of carbon atoms is not more than 12.

Examples of suitable glycols are ethylene glycol, propane-1, 2-diol, porpane-1:3-diol, tetramethylene glycol and neopentylene glycol. Minor proportions of glycols not of the above defined structural class may be included in copolyester structures, provided that they have adequate reactivity and stability not to hinder the achievement of the required molecular weight.

The diamine with which the capped polyester is reacted should be an aliphatic cycloaliphatic or oxyaliphatic diamine, or a mixed aliphatic-aromatic diamine in which the —$NH_2$ groups are attached to methylene or substituted methylene groups and not to carbon atoms forming part of an aromatic system. The diamine should preferably be such that a polymeric or oligomeric amide formed from it and the dicarboxylic acid HOOC—(—X—)$_n$—COOH wherein $n$ and X are as hereinbefore defined, has a melting point of at least 280° C. Examples of suitable diamines are hexamethylene diamine, dodecamethylene diamine, piperazine, p-xylylene diamine and bis(p-aminocyclohexyl)methane with a high ratio of trans-trans isomer. Examples of suitable dicarboxylic acids are terephthalic acid, diphenyl-4:4'-dicarboxylic acid, naphthalene-2:6-dicarboxylic acid, naphthalene-2:7-dicarboxylic acid, 1:2-diphenoxy-4:4'-dicarboxylic acid and diphenyl sulphone-4:4'-dicarboxylic acid. Examples of suitable pairs of diamine and dicarboxylic acid are hexamethylene-diamine and terephthalic acid, dodecamethylene-diamine and terephthalic acid, and hexamethylenediamine and diphenyl-4,4'-dicarboxylic acid. Minor amounts of other diamines and diaryl esters of dicarboxylic acids may be present, provided that the melting point of the corresponding derivable co-polyamide still exceeds 280° C.

Preferably the final polyesteramide should have a molecular weight corresponding to a relative viscosity of at least 2.0, measured at a concentration of 1% in orthochlorophenol. This is ensured by continuing the polyesteramide forming process until the desired viscosity is attained. The polyesteramides produced according to the process of the present invention are of value for the manufacture of fibres by melt spinning.

In order that the present invention may be more fully understood, we give hereinafter examples of putting it into practice. In these examples all parts are by weight.

EXAMPLE 1

A hydroxyl-ended copolyester was prepared by reacting adipic acid with ethylene glycol (70 molar %) and neopentylene glycol (30 molar %) at a temperature of 240° C. in the absence of catalyst until the molecular weight of the product was 1,790. This is Product A. The product A (2237.5 parts), diphenyl terephthalate (795 parts) and toluene (475 parts) were stirred and heated to the boiling point in a vessel fitted with a water-separating still-head until no more water was distilling. The toluene was removed by distillation under reduced pressure, and the heating continued to raise the temperature to 180° C. Antimony trioxide (3 parts) was added and the mixture was stirred in an atmosphere of nitrogen at 1 atmosphere pressure for 40 minutes while the temperature was maintained at 220°–240° C. The pressure was then reduced progressively over a period of 15 minutes to 1 mm. and maintained at that pressure for 35 minutes at a temperature of 240° C. while the phenol formed by reaction was distilled off. The product was cooled under a nitrogen atmosphere to 130° C. when crystals appeared. The capped polyester so obtained was a dispersion of crystalline material in viscous resin having a soft, cheese-like consistency and with theoretical molecular weight 2,238.

The capped polyester (69.3 parts) and hexamethylene diamine (3.6 parts) were weighed into a glass polymerisation tube fitted with a stainless steel helical stirrer. The tube was purged of air and filled with nitrogen at atmospheric pressure and immersed in a heating bath at 200° C. Nitrogen was passed over the reactants at a slow rate. The mixture was stirred and maintained at 200° C. for 15 minutes. The temperature was then raised to 260° C. over a period of 8 minutes. The pressure was then reduced to 0.1 mm. over a period of 12 minutes and the mixture maintained at 260° C. and 0.1 mm. with stirring for 40 minutes. The resultant polymer was extremely tough and rubbery, forming a grey translucent mass, having a Vicat softening point of 180° C. It had a relative viscosity, measured at 1% concentration in orthochlorophenol, of 2.536.

The polymer was melt-spun at 270° C., and gave after drawing fibres with the following properties:
Decitex 141.1
Tenacity 0.25 g/decitex
Extensibility 785%
Elastic recovery from 200% extension (4 cycles): 98, 99, 100, 99%
Work recovery from 200% extension (4 cycles): 40, 77, 83, 82%
Growth in air from 200% extension for 24 hours
  (a) Relax 1 minute 38.3%
  (b) Relax 24 hours 19.2%

These properties are measured as described in British Pat. Specification No. 1,192,390 with the exception that the elastic and work recoveries are from 200% extension as opposed to 100% extension.

The polymer when spun as a side by side bicomponent fibre with 66 nylon gave, on drawing and removing the tension, a yarn with a tight helical crimp.

EXAMPLE 2

Product A from Example 1 (447.5 parts) was dried by stirring under a pressure of 0.1 mm. for 1 hour at 120° C. Diphenyl terephthalate (159 parts) was dried in vacuum at 100° C. Antimony triphenoxide for use as a catalyst was prepared by boiling together antimony trioxide (14.6 parts) and phenol (56.4 parts) under a fractionating column which allowed removal of water of reaction and return of the reactants. The boiling was continued until (a) no more water distilled, (b) the initial turbid suspension had changed to a cloudy solution and (c) the solution temperature had risen from 184° C. to 195° C. A proportion of the excess phenol was distilled off and the antimony triphenoxide, still containing some free phenol, was allowed to solidify on cooling to a hard grey, crystalline mass (51.0 parts) having an antimony content equivalent to 28.6% by weight of $Sb_2O_3$. The amount of antimony triphenoxide used was 0.52 parts.

The Product A, the diphenyl terephthalate and the antimony triphenoxide were heated with stirring to 235° C. and the temperature maintained at 235°–240° C. under nitrogen for 40 minutes with formation of a homogeneous, straw-coloured melt. The pressure was reduced to 0.01 mm. during 10 minutes, while the temperature was lowered to 220° C., and the melt was stirred for a further 10 minutes at 215°–220° C. and 0.01–0.04 mm. pressure; phenol distilled off during this stage (43.3 parts). The capped polyester was cooled to give an off-white semi-crystalline mass.

The capped polyester (78.4 parts) and hexamethylene diamine (4.1 parts) were mixed in a glass tube fitted with a stainless steel stirrer and heated under nitrogen with stirring for 10 minutes at 150° C., 15 minutes at 200° C. and 15 minutes at 260° C. The temperature of 260° C. was maintained while the pressure was reduced to 0.1 mm. over 10 minutes, and the reaction mixture was stirred under this pressure for a further 55 minutes, during which the product attained a very high viscosity.

On cooling, the product formed a tough, elastic, light grey block. The relative viscosity, measured as described in Example 1, was 2.544.

EXAMPLE 3

Capped polyester was prepared as in Example 1. The capped polyester (70 parts) and dodecamethylenediamine (6.3 parts) were weighed into a glass polymerisation tube fitted with a stainless steel helical stirrer. The tube was purged of air and filled with nitrogen at atmospheric pressure and immersed in a heating bath at 200° C. and the mixture was stirred at this temperature for 15 minutes. The temperature was raised to 260° C. over 8 minutes, and the pressure then reduced to 0.1 mm. over 12 minutes, and polymerisation was completed by stirring under these conditions for 60 minutes. The final polymer was a greenish-grey tough, rubbery solid having a relative viscosity (as defined in Example 1) of 4.32 and a Vicat softening point of 150° C.

The polymer was melt-spun at 230° C. and gave filaments with the following properties:

Decitex: 131
Tenacity: 0.25 g/decitex
Extensibility: 1000%
Elastic recovery (from 200%) 1st cycle 90%; 4th cycle 95–100%
Work recovery (from 200%) 1st cycle 40%; 4th cycle 70–73%
Stress decay
  at 100% extension (15 min.) 31%
  at 200% extension (15 min.) 33%

EXAMPLE 4

Capped polyester was prepared in a glass reaction vessel as in Example 2. The capped polyester (1305 parts) was stirred under a nitrogen atmosphere in a stainless steel autoclave at 204° to 210° C. while a 60% w/w solution of hexamethylenediamine in phenol (112.7 parts of solution) was added over 10 minutes. The mixture was heated under nitrogen to 259° C. and the pressure was reduced to 0.7 mm. over 22 minutes.

Stirring was continued for 85 minutes at 256° to 262° C. and 0.4 to 9.7 mm., and the viscous polymer was extruded under nitrogen pressure into cold water, forming a light yellow tough transparent lace. The polymer had a relative viscosity of 2.746.

The moist polymer was cut into chips and dried at 70° C. overnight under reduced pressure; its relative viscosity was then 2.747. The dried polymer was melt-spun through a single hole of 0.02 inches (0.5 mm.) diameter at 184° C. and wound up at 300 ft/min. into a clear elastic filament. The spun yarn had a relative viscosity of 2.513 and its mechanical properties were:

Decitex: 291.6
Breaking load: 15.1 g.
Tenacity: 0.052 g/decitex
Extensibility: 842%
Elastic recovery
  (1st cycle) 88.5%
  (4th cycle) 92.5%

EXAMPLE 5

A hydroxyl-ended copolyester was prepared as in Example 1, except that the molecular ratio of glycols used as ethylene glycol (80%): neopentylene glycol (20%), and the molecular weight as estimated from the hydroxyl content was 2120. The polyester (1030 parts), diphenyl terephthalate (309 parts) and antimony triphenoxide (prepared as in Example 2, 2.1 parts) were charged to a stainless steel autoclave pre-heated to 180° C. The charge was stirred under a nitrogen atmosphere while its temperature was raised to 228° C. and then maintained for 40 minutes at 230°±2° C. Phenol produced by the capping reaction was then distilled from the autoclave by lowering the pressure to 0.7 to 0.8 mm. while the temperature was allowed to fall to 220° C., and maintaining these conditions for 20 minutes. Nitrogen was admitted, and the charge allowed to cool further while 93.9 parts of a 60% w/w solution of hexamethylenediamine in phenol was added over 8 minutes at 208° to 203° C. The charge was then heated under nitrogen to 253° C., and the pressure was reduced to 0.6mm. during 17 minutes while the temperature was brought to 258° C. Finally the charge was heated for 100 minutes at 260° C. and 0.6 mm. pressure, and the viscous polymer formed was extruded as in Example 4. The tough elastomeric product had a relative viscosity of 3.056.

After drying as in Example 4 a sample of the polymer was melt-spun through a 5-hole spinneret of which each hole was of 0.009 inches (0.23 mm.) at 220° C. and wound up at 1500 ft./min. into a yarn of 45.8 decitex. Physical test results were as follows:
 Breaking load: 11.5 g.
 Tenacity: 0.25 g./decitex
 Extensibility: 427%
 Elastic recovery (from 200% extension) — (mean of 3 samples):
  1st extension cycle 79.4%
  2nd extension cycle 92.6%
  3rd extension cycle 92.6%

EXAMPLE 6

By the method of Example 1 a hydroxyl-ended homopolyester was prepared from propane-1,2-diol and adipic acid; the molecular weight as estimated from the hydroxyl content was 1976. The polyester (395.2 parts) was dried by heating under vacuum as in Example 2. Diphenyl terephthalate (127.2 parts) and antimony triphenoxide (0.42 parts) were added and the mixture was stirred under nitrogen for 10 minutes at 235° to 240° C. The pressure was reduced to 0.01 mm. over 11 minutes and kept at this value for 20 minutes, while the temperature was reduced to 200° C. The capped polyester was cooled under nitrogen, forming a sticky white semi-crystalline mass.

The capped polyester (77.5 parts) and 7.6 parts of a 60% w/w solution of hexamethylenediamine in phenol were stirred together under nitrogen for 15 min. at 200° C. and for 8 minutes while the temperature was raised to 260° C. The pressure was then reduced over 7 minutes to 0.01 mm. and the melt stirred at 260°/0.01 mm. for 60 minutes. A homogenous melt was not obtained at any stage and the final polymer was a low viscosity melt containing a dispersed solid phase. After cooling, it formed an opaque resin with low strength, which had a relative viscosity of 1.511.

In attempts to form a homogenous polyesteramide the reaction of the capped polyesteramide and hexamethylenediamine was repeated under similar conditions with various increased proportions of phenol was diluent, but the separation of a solid phase was merely delayed to a later stage of the process and no substantial increase in polymer melt or solution viscosity was obtained.

EXAMPLE 7

By the method of Example 1 a hydroxyl-ended homopolyester was prepared from ethylene glycol and adipic acid; the molecular weight as estimated from the hydroxyl content was 2058. The polyester (411.6 parts) was dried by heating under vacuum as in Example 2. Diphenyl terephthalate (127.2 parts) and antimony triphenoxide (0.42 parts) were added and the mixture was stirred under nitrogen for 40 minutes at 235° to 240° C. The pressure was reduced to 0.01 mm. over 5 minutes and kept at this value for 20 minutes, while the temperature was lowered to 200° C. The capped polyester was cooled under nitrogen, forming a white hard wax.

The capped polyester (82.7 parts) and 7.9 parts of 60% w/w hexamethylenediamine/phenol solution were stirred together under nitrogen for 15 minutes at 200° C. and for 6 minutes while the temperature was raised to 260° C. The pressure was then reduced over 7 minutes to 0.05 mm. and the melt stirred at 260°/0.05 mm. for 60 minutes. A homogeneous melt was not obtained at any stage. The final polymer was a viscous pale yellow liquid containing finely dispersed solid, forming a tough, semi-rigid resin on cooling, which had a relative viscosity of 2.148.

When the capped polyesteramide was treated with hexamethylenediamine under similar conditions with additional phenol as diluent a solid phase again separated from the melt, during distillation of the phenol. The final polymer had similar physical properties, and a relative viscosity of 1.677.

EXAMPLE 8

A hydroxyl-ended homopolyester was prepared from diethyleneglycol and adipic acid by the method of Example 1 but with the addition to the reactants of stannous octoate is quantity sufficient to give a concentration of 15 parts per million of tin in the polyester; the molecular weight as estimated from the hydroxyl content was 1924. The polyester (384.8 parts) was dried by heating under vacuum as in Example 2. Diphenyl terephthalate (127.2 parts) and antimony triphenoxide (0.42 parts) were added and the mixture was stirred under nitrogen for 40 minutes at 235° to 240° C. The pressure was reduced to 0.01 mm. over 12 minutes and kept for 20 minutes at 0.01 mm, while the temperature was reduced to 210° C. The capped polyester was cooled under nitrogen, forming a sticky semi-solid fawn-coloured mass.

The capped polyester (76.6 parts) and 7.7 parts of 60% w/w hexamethylenediamine/phenol solution were stirred together under nitrogen for 15 minutes at 200° C. and for 8 minutes while the temperature was raised to 260° C. The pressure was reduced over 7 minutes to 0.01 mm. and the melt stirred at 260°/0.01 mm. for 60 minutes. No solid phase was observed, but the melt was translucent rather than clear, suggesting a lack of compatibility in the composition. After cooling, the polymer was a translucent, stiff resin of low strength, and had a relative viscosity of 1.864.

EXAMPLE 9

A hydroxyl-ended copolyester was prepared from adipic acid and an equimolecular mixture of ethylene glycol, butan-1, 4-diol by the method of Example 1 but with the addition to the reactants of stannous octoate in quantity sufficient to give a concentration of 15 parts per million of tin in the polyester; the molecular weight as estimated from the hydroxyl content was 1986. The polyester (397.2 parts) was dried by heating under vacuum as in Example 2. Diphenyl terephthalate (127.2 parts) and antimony triphenoxide (0.42 parts) were added and the mixture was stirred for 40 minutes at 235° to 240° C. The pressure was reduced to 0.01 mm. over 7 minutes and kept at 0.01 mm. for 20 minutes while the temperature was reduced to 220° C. The capped polyester was cooled under nitrogen, forming a sticky pale fawn semi-solid mass.

The capped polyester (63 parts) and 6.3 parts of 60% w/w hexamethylenediamine/phenol solution was stirred together under nitrogen for 15 minutes at 200° C. and for 7 minutes while the temperature was raised to 260° C. The pressure was reduced over 11 minutes to 0.05 mm. and the melt stirred for 60 minutes at 260°/0.05 mm. After cooling the polymer formed a clear greenish-yellow tough rubbery solid, having a relative viscosity of 1.929.

EXAMPLE 10

By the method of Example 1 a hydroxyl-ended copolyester was prepared from adipic acid and a mixture of ethylene glycol and propan-1,2-diol in molecular ratio 70:30. The molecular weight as estimated from the hydroxyl content was 2113. The copolyester (1031 parts) and triphenyl phosphate (0.64 parts) were charged to a stainless steel autoclave at 135° C. and dried by stirring for 1 hour at 125° to 130° C. under 0.05 mm. pressure. Diphenyl terephthalate (328.1 parts) and antimony triphenoxide (3.15 parts) were added and the mixture was heated under nitrogen over 35 minutes to 195° C. and stirred for 40 minutes at 195°–200° C. The pressure was then reduced over 18 minutes to 0.4 mm. and phenol was distilled out during 14 minutes at 195°–197° and 0.4 mm. To the capped polyester to prepared, at 197°–205° C., was added under nitrogen with stirring 99.8 parts of a 60% w/w solution of hexamethylenediamine in phenol. The solution was heated over 25 minutes to 255°, and the pressure was reduced over 15 minutes to 2.0 mm. Finally the melt was stirred for 135 minutes at 260° C. and 0.5 mm., and the highly viscous product extruded by nitrogen pressure into cold water. The polymer was a tough elastomer having a relative viscosity of 3.405.

After drying as in Example 4 a sample of the polymer was melt-spun through a spinneret as described in Example 5 at 210° C. and wound up at 1500 ft./min. into a yarn of 105.5 decitex. Physical test results were as follows:

Breaking load: 20.5 g.
Tenacity: 0.19 g./decitex
Extensibility: 720%
Elastic recovery (from 200% extension):
   1st extension cycle 89.6%
   2nd extension cycle 94.9%
   3rd extension cycle 95.1%

What we claim is:

1. A process for the preparation of a high molecular weight, linear polyesteramide comprising the steps of
   (a) reacting at least one dicarboxylic acid of the formula HOOC—D—COOH with at least one glycol of the formula HO—E—OH wherein $D = (R)_m$ and $E = (R)_q$ $m$ being an integer from 3 to 10
   $q$ being an integer from 2 to 12, and
   $R$ being independently selected from the group consisting of $(CH_2)$, a combination of $(CH_2)$ and $(CHCH_3)$, and a combination of $(CH_2)$ and $(C(CH_3)_2)$,
   to produce an initial, hydroxy-terminated, polyester having a molecular weight within the range 700 to 10,000,
   (b) reacting the initial polyester in the presence of a catalyst with a diaryl ester of a carboxylic acid of the formula A—OOC—(X)$_n$—COOB
   wherein $n$ is selected from 0 and 1,
   X is a divalent aromatic group, and A and B are each independently a monovalent aryl group having 6 to 20 carbon atoms
   the molecular ratio of the diaryl ester of the carboxylic acid to the polyester being within the range 1.5:1 to 5:1, to give a capped polyester in which virtually all the ends are derived from the diaryl ester of the dicarboxylic acid, and
   (c) reacting the capped polyester with a diamine at a temperature above 220° C.

2. A process according to claim 1 wherein X is paraphenylene.

3. A process according to claim 1 wherein the catalyst employed for the reaction of the diaryl ester of the carboxylic acid with the initial polyester is a compound of a metal selected from the group consisting of antimony, germanium, tin, titanium, zinc, cobalt, manganese and lead.

4. A process according to claim 1 wherein the dicarboxylic acid used for preparing the initial polyester is selected from the group consisting of adipic, azelaic, 2,2,4-trimethyl adipic, and dodecanedioc acids.

5. A process according to claim 1 wherein the glycol is selected from the group consisting of ethylene glycol, propane - 1,2-diol, propane - 1,3-diol, tetramethylene glycol, and neopentylene glycol.

6. A process according to claim 1 wherein the diamine is selected from the group consisting of aliphatic, cycloaliphatic, and oxyaliphatic diamines, and a mixed aliphatic - aromatic diamine in which the —NH$_2$ groups are attached to a group selected from methyl and substituted methylene groups and not to carbon atoms forming part of the aromatic system.

7. A process according to claim 6 wherein the diamine is selected from the group consisting of hexamethylene diamine, dodecamethylene diamine, piperazine, p-xylene-diamine, and bis (p-aminocyclohexyl) methane having a high ratio of trans-trans isomer.

8. A process according to claim 1 wherein step (c) is continued until the relative viscosity is at least 2.0, measured at a concentration of 1% in orthochlorophenol.

9. A polyesteramide produced according to claim 1.

* * * * *